(12) United States Patent
Conti et al.

(10) Patent No.: US 10,195,520 B1
(45) Date of Patent: Feb. 5, 2019

(54) SYSTEM AND METHOD FOR NETWORK GAMING ARCHITECTURE

(71) Applicant: Take-Two Interactive Software, Inc., New York, NY (US)

(72) Inventors: Dan Conti, Reading, MA (US); Evan Michaels, Bromley (GB); Kevin Baca, Carlsbad (CA)

(73) Assignee: TAKE-TWO INTERACTIVE SOFTWARE, INC., New York, NY (US)

(*) Notice: Subject to any disclaimer, the term of this patent is extended or adjusted under 35 U.S.C. 154(b) by 238 days.

(21) Appl. No.: 13/894,099

(22) Filed: May 14, 2013

(51) Int. Cl.
| | |
|---|---|
| A63F 9/24 | (2006.01) |
| A63F 13/00 | (2014.01) |
| A63F 13/30 | (2014.01) |
| A63F 13/32 | (2014.01) |
| A63F 13/60 | (2014.01) |

(52) U.S. Cl.
CPC .............. *A63F 13/12* (2013.01); *A63F 13/30* (2014.09); *A63F 13/32* (2014.09); *A63F 13/60* (2014.09)

(58) Field of Classification Search
CPC .......... A63F 17/32; A63F 17/30; A63F 17/60; A63F 13/32; A63F 13/30; A63F 13/60
USPC ......................................................... 463/42
See application file for complete search history.

(56) References Cited

U.S. PATENT DOCUMENTS

| | | | |
|---|---|---|---|
| 6,493,871 B1* | 12/2002 | McGuire et al. ............. | 717/173 |
| 2001/0003715 A1* | 6/2001 | Jutzi et al. ...................... | 463/40 |
| 2004/0034850 A1* | 2/2004 | Burkhardt ................. | G06F 8/65 |
| | | | 717/120 |
| 2008/0182659 A1* | 7/2008 | Sabella et al. .................. | 463/29 |
| 2009/0262137 A1* | 10/2009 | Walker et al. ................ | 345/629 |
| 2012/0159468 A1* | 6/2012 | Joshi ......................... | G06F 8/71 |
| | | | 717/172 |
| 2013/0116044 A1* | 5/2013 | Schwartz ................ | A63F 13/12 |
| | | | 463/29 |
| 2013/0219383 A1* | 8/2013 | Hilerio ...................... | G06F 8/65 |
| | | | 717/178 |

OTHER PUBLICATIONS

League of Legends Wiki, "Patch", Wikipedia, retrieved on Apr. 6, 2015 and released Apr. 9, 2013 from Internet at URL<leagueoflegends.wikia.com/wiki/Patch/>.*
IGN, "The Best LoL Match Ever Played", retrieved from internet on Jun. 15, 2015 and released Dec. 2, 2012, from Internet at URL<https://www.youtube.com/watch?v=XUFmbdTksuo>.*

* cited by examiner

*Primary Examiner* — Jay Liddle
*Assistant Examiner* — Ryan Hsu
(74) *Attorney, Agent, or Firm* — Orrick, Herrington & Sutcliff LLP

(57) ABSTRACT

Disclosed are systems and methods for selectively, dynamically, and quickly altering software without the need for a complete software update. The disclosed system allows for selectively, dynamically, and quickly altering software by using a plurality of script files that can alter any aspect of the software. More specifically, the software relates to videogames and the system provides event scripts that selectively, dynamically, and quickly change the players gaming experience and particularly related to multiplayer gaming. The event scripts can initiate group events during a multiplayer game session to increase player involvement, interest, and excitement.

19 Claims, 3 Drawing Sheets

SYSTEM AND METHOD FOR NETWORK GAMING ARCHITECTURE

CROSS REFERENCE TO RELATED APPLICATIONS

This application is submitted concurrently with commonly assigned application Ser. No. 13/894,112, entitled "System and Method for Online Community Management," Ser. No. 13/894,109, entitled, "System and Method for Multiplayer Network Gaming," and Ser. No. 13/894,104, entitled, "System and Method for Time Flow Adjustment in Multiplayer Games," which are incorporated herein by reference.

FIELD

The present disclosure generally relates to network gaming architecture for dynamically altering games. More specifically, the present disclosure describes computerized systems, methods, and apparatuses for improved modification of games, data collection and publishing, initiating multiplayer gaming events, and providing an enhanced gaming experience.

BACKGROUND OF THE INVENTION

Early videogames were simple linear single player games following a set storyline. The gaming experience generally ended after the user has finished playing through the storyline. The value of the game was typically limited to what was provided at the time of distribution. The value of a game is oftentimes measured by the number of hours it takes to complete the single player game, i.e., how long the game can engage the player; similar to a movie's duration. Multiplayer modes of play can extend the gaming experience for the player. Indeed, many games today offer an online multiplayer gaming experience in addition to the single player mode. Multiplayer modes can offer players more playtime since, unlike a single player storyline mode, the player's experience is different with each new opponent. Multiplayer modes can be implemented over the Internet through a network connecting players with other players. While this extends the amount of new and engaging playing time, even multiplayer game modes can become boring and repetitive after time.

Videogames are also not always released in perfect working order and there can often times be bugs that need to be fixed. A bug can be anything that causes the game to not function as it was intend. Bugs are often subtle in that they only occur in very unique situations. Thus, they are difficult to find in the limited testing available prior to distribution. However, fixing bugs generally requires the implementation of an update where users are required to download a large file to fix the bugs. The creation of these large updates and their distribution can be a labor intensive task to game developers. The process is further complicated and made more expensive when it involves games operating over a third party's network that requires authorization and special procedures for implementing an update. Due to the laborious nature of implementing a software update, game developers are often not able to quickly implement bug fix changes Unless it is a major bug or error, game developers will often push off publishing software updates until a significant number of updates are needed. Thus, players must wait longer until a software update is provided for the less critical bugs to be fixed. This can cause frustration among players and diminish from the game experience.

Another important feature of many multiplayer games is the balancing of game features. Multiplayer games often pit players against other players over a network. An important feature for any multiplayer game system is that it must be balanced in view of the various choices of game elements a user may select. Players may choose from a plurality of options and settings for their character or experience to tailor to their play style. For instance, in a fighting game, a player may choose to be a strength based character that sacrifices speed for strength while an opposing player may choose to be an agility based character that sacrifices strength for speed. However the total effectiveness of each character should remain roughly similar, i.e., no one character type should have a significant advantage over the other. The same principles of balancing can apply to the balance of weapons characteristics in shooting games. It is often difficult to determine the appropriate balance of game options before the game has been released and played extensively. Real world play experience allows the game developers to receive feedback from users and analyze a sufficiently large sample of play data. In view of this data, developers often readjust the mix of game options and capabilities. Like the bug fixes above, these tweaks are often implemented via game updates and are often times implemented in conjunction with bug fixes as a single large update. However, as discussed above, the cumbersome process of distributing an update tends to delay the number and frequency of these sorts of changes. This delay in update releases can cause dissatisfaction in players.

BRIEF SUMMARY OF THE INVENTION

Innovative systems and methods for network gaming architectures are disclosed for addressing the above problems. The disclosed system and methods are applicable for use with any software product where additional content is to be delivered in a quick and cost effective manner. The disclosed system and methods are particularly useful in videogames that are connected to a network and more specifically multiplayer videogames implemented over a network.

The disclosed systems and methods improve on existing network gaming architectures by the implementation of a cloud based network divided into several subsections: Global Name Space, Title Name Space, User Generated Content Space, User Group Space, and User Space. The Global Name Space and the Title Name Space may be implemented over a content delivery network (CDN). The User Generated Content Space, User Group Space, and User Space may be implemented over a traditional server maintained by the game developer.

Global Name Space:

The Global Name Space provides a place for the game developer to store content on the network that is not related to any videogames.

Title Name Space:

The Title Name Space provides a place for the developer to store content related to a specific game title. The Title Name Space thus stores content for all game titles organized by folders. Each game will have its own folder that is specific for the game as well as the platform on which the game operates. Within each of these folders is contained a set of files that can be updated and altered as desired by the developer. These files are used to dynamically alter the game and are delivered to the players over the content delivery network upon start of the game and connection to the network. The files operate by providing code in a script language that is processable by the game. A benefit of using this system is that individual features can be changed without the need for a large update. The files include: background script files, game balancing files, playlist files, achievement files, and multiplayer script event files. In addition, the Title Name Space also stores telemetry information obtained from the game's telemetry system during play of multiplayer games for review and use by the developer. Similarly, news files are also stored in the Title Name Space and can be used to deliver targeted news content related to the player's gaming experience.

The background script files enable developers to fix bugs in the game without a software update. Background script files run using the game's existing script language. Background script files are accompanied by a manifest file that identifies when to run the script during the game. This way bugs at certain points in a game can be fixed quickly by the background script running in the game. Moreover, the manifest allows the scripts to be run efficiently so they only take up game resources when and where they are needed. Thus, the script files are segregated from came code and can be altered separately from game code to implement modifications to game play.

This segregation is accomplished in a preferred embodiment by providing a multiplayer game script. Script code is an efficient mechanism for adapting existing game code to create varied new game play. For example, a script can access existing game code to create an environment from the single player version of a game and populate it with the players participating in the multiplayer game, as well as other game elements appropriate for the game (such as weapons, vehicles, monsters, etc.). In order for the existing game code to operate the script, the existing game code includes a script runtime process that is responsible for execution of the scripts by providing infrastructure such as, handling the event queue relevant to the script, creating the event watchers that trigger based on event bindings, providing wait timers, and performing host migration routines. In other words, this code provides a framework for the synchronous execution of scripts and enables the scripts to be executed in parallel across games systems associated with each of the players.

In addition to bugs in a game, developers may also want to alter certain aspects of the game in order to improve the user's experience. These features generally relate to adjusting values and constants in order to create a balanced and fair game for players. Like the bugs, these tweaks need not be done through the laborious process of a software update, but instead can be quickly, selectively, and dynamically done through a script file. In one embodiment, the game is a multiplayer shooting game offering players a wide variety of weapons. Balance among these weapons is an important aspect of multiplayer game play, however obtaining the right values for the weapons requires trial and error and is a continual process that occurs after the initial release of the game. Thus, game developers can upload new weapons tuning files onto the Title Name Space in the appropriate folder for the game to efficiently implement these changes.

Playlist files, achievement files, and multiplayer script event files are used to alter the rules and objectives of the game thereby providing players with a new gaming experience. More specifically playlist files provide players with a list of game types that a player may select and play through. For instance, in a multiplayer shooting game embodiment, a playlist file may have a series of matches such as: death match, capture the flag, or any other series of match types. Achievement files may provide players with new tasks to complete in order to obtain achievement awards. The tasks may be tiered and award players based on certain levels of achievement. Finally, multiplayer script event files, discussed in greater detailed in concurrently filed and commonly assigned application Ser. No. 13/894,109, entitled "System and Method for Multiplayer Network Gaming," incorporated herein by reference, enables nearly any feature in the game to be modified with a script event file without the need for a software update.

The system's telemetry information is also stored in the Title Name Space. This information allows developers to observe how the game is being played and identify balance issues, bugs, and monitor progress of game events for use with other systems. In one particular system that the telemetry information is used with is the User Group Interaction Event System, which will be discussed in greater detail below. The telemetry information can also be selectively published. In another embodiment, the telemetry system is used to monitor for cheating as described in greater detail in concurrently filed and commonly assigned application Ser. No. 13/894,112, entitled, "System and Method for Online Community Management."

User Generated Content Space:

User generated content may be stored in a separate section. Alternatively, it may also be stored in the User Name Space.

User Group Space:

To increase player engagement, players are allowed to join a group of players identified by the system as being linked. Players in groups may engage in team play that enables them to access additional game events not provided to lone players. The User Group Space enables players to store their group emblem, post messages to other group members, interact with other group members, and view their group history/stats. The telemetry system may also store stats related to groups here.

User Space:

The User Space is where player specific information is stored: game data, saved games, stats, game options, and player avatar. Storing such information on the network enables players to access and play their game from any console connected to the network. Developers may also provide tags that enhance or diminish a player's status such as a user specific experience modifier, admin tags, and cheater tags. Admin tags allow developers to tag themselves or designed players as administrative staff which may enable them access to admin menus. Finally, the cheater tag information may be stored here to classify abusive players. The cheater classification system is described in greater detail in concurrently filed and commonly assigned application Ser. No. 13/894,112, entitled, "System and Method for Online Community Management," incorporated herein by reference.

The User Group Interaction Event System utilizes the system's network architecture to implement an enhanced gaming experience to players by dynamically initiating events within a game. During a game, a game challenge event is initiated between with members from different groups if certain criteria are met. These criteria may be modified using script files as discussed above. The User Group Interaction Event System utilizes events to signal and identify instances during a game where one group has been obtained a significant advantage over another group. In the embodiment of a multiplayer shooting game, an event may be initiated when members of one group have obtained a minimum number of group member kills more than the members of a second group. This would initiate an event to indicate that an advantage has been achieved by one group and to motivate members of the two groups to duel. To add excitement to the event, special graphics, sounds, and announcements can be implemented with the initiation of an event and additionally game points, awards, and badges may be given to winners of the event.

The system and method also enable game content to be shared across platforms and titles. Users can incorporate content from different games or applications. Cross platform content can be sub or mini games that can be played on another console or a mobile application on a smartphone that helps the player progress in the main console game.

An embodiment that is provided for the present invention is implemented in a network gaming system for altering the operation of a game. The system having multiple consoles connected to a network and server. The consoles having a processor, network interface connected to the processor for communicating with a network, and memory connected to and in communication with the processor containing processor executable instructions including game code. The processor is configured to execute instructions contained in the memory and the instructions are structured to cause the console to obtain a script file via the network interface where the script file has a manifest that binds the script code to the game code. The game code has framework to process the manifest and script. The processor then executing the game code and then the script code according to conditions specified by the manifest to create an altered game experience for the player. This altered game experience is different from the experience that would be present without the script code.

DETAILED DESCRIPTION OF THE INVENTION

The present disclosure describes a number of methods and computerized systems for selectively, quickly, and dynamically changing a videogame. The present disclosure further describes a number of methods and computerized systems for collecting telemetry data and using such data to initiate group interaction events during play of a videogame.

Figure 1:
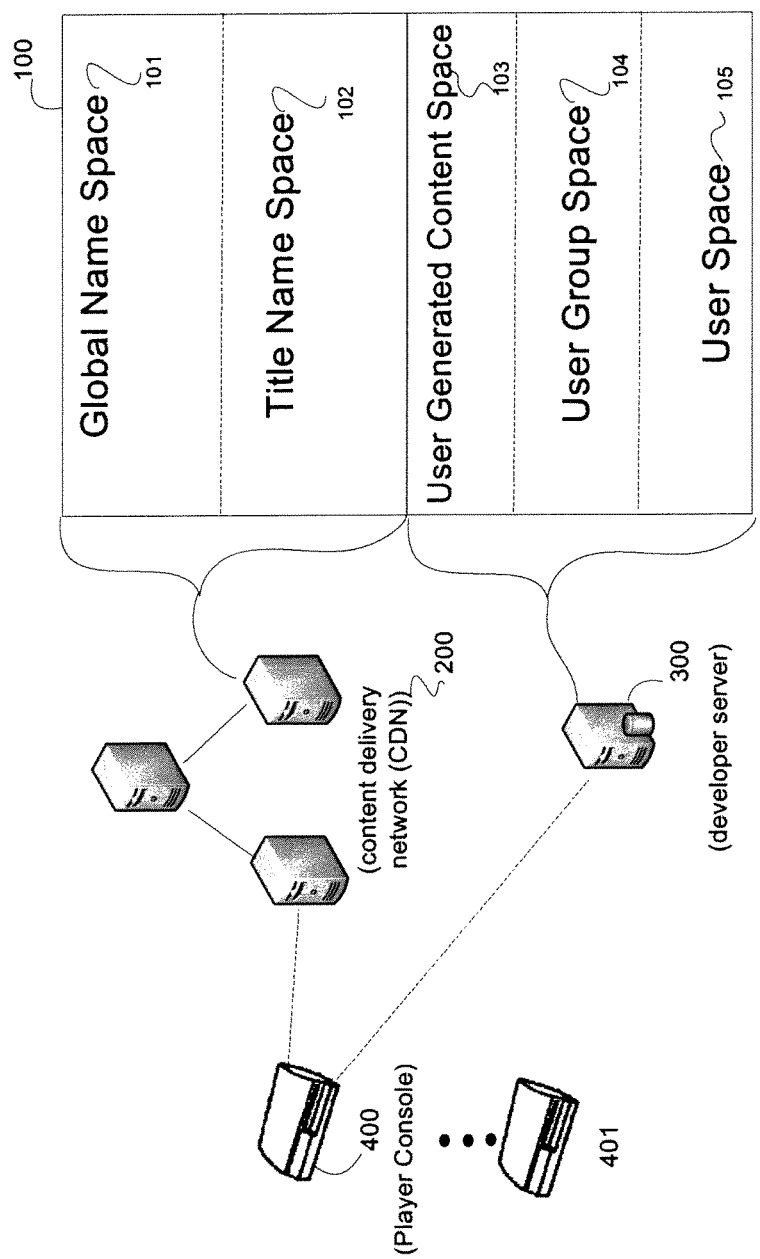
FIG. 1 is a diagram depicting the network gaming architecture according to an embodiment of the present invention.

FIG. 1 depicts the network gaming architecture according to an embodiment of the present invention. The cloud based network 100 is divided into several subsections: Global Name Space 101, Title Name Space 102, User Generated Content Space 103, User Group Space 104, and User Space 105. The Global Name Space 101 and the Title Name Space 102 may be implemented over a content delivery network (CDN) 200. These two spaces are preferably implemented over a CDN due to the higher demands for bandwidth and the need to quickly distribute their contents to a large pool of players. The User Generated Content Space 103, User Group Space 104, and User Space 105 may be implemented over a traditional server 300 maintained by the game developer. In alternative embodiments the cloud based network 100 can be implemented in a single server machine, multiple server machines, a CDN, or any combination of the three.

The CDN 200 and developer server 300 communicate with a plurality of player consoles 400 and 401. A player console can be any system with a processor, memory, capability to connect to the network 100, and capability of executing gaming software in accordance with the disclosed invention. Some examples of a console include: Sony Playstation, Microsoft Xbox, Nintendo Wii, personal computers, and even smartphones.

Global Name Space:

The Global Name Space 101 provides a place for the game developer to store content on the network that is not related to any particular videogame or related to all games. This content could be general news or announcements related to the developer. For instance, the developer could announce the release of a new game and provide links for purchasing the game.

Title Name Space:

The Title Name Space 102 provides a place for the developer to store content related to a specific game title. The Title Name Space thus stores content for all game titles organized by folders. Each game will have its own folder that is specific for the game as well as the platform on which the game operates. Within each of these folders is contained a set of files that can be updated and altered as desired by the developer. These files are used to dynamically alter the game and are delivered to the players over the CDN 200 upon start of the player console 400 and connection to the cloud network 100. Each file is used to alter a different aspect of the game and thus enables developers to selectively change each corresponding feature of the game. The files operate by providing code in a script language that is processable by the game. A benefit of using this system is that individual features can be changed without the need for a large update. The files include: background script files, game balancing files, playlist files, achievement files, and multiplayer script event files. The files are executed at the console 400 and the console performs the logic and operations for executing the game in accordance with the system and methods disclosed.

Figure 2:
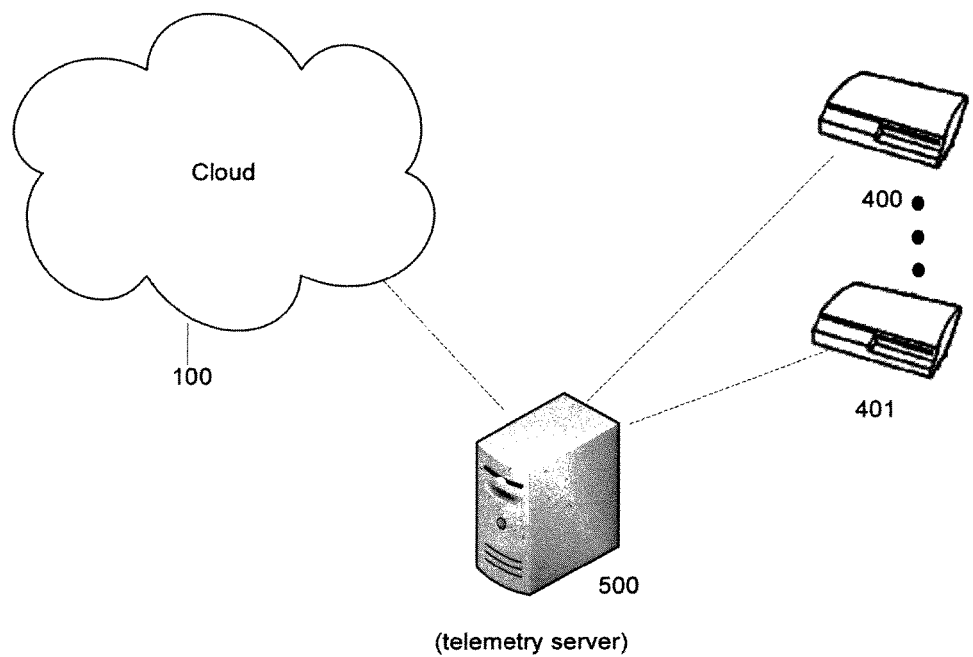
FIG. 2 is a diagram depicting the telemetry system.

In addition, the Title Name Space 102 may also store telemetry information obtained from the game's telemetry system during play of multiplayer games for use by the developer. In one embodiment, depicted in FIG. 2, the telemetry information is stored on a separate telemetry server 500 that selectively transmits some of the telemetry information to the Title Name Space 102 depending on the preference of the developer. The system may selectively publish the telemetry information. In an embodiment of the present invention, the telemetry system compiles significant events from a match and publishes it as a Match History. As the match plays out, each game console 400 and 401 sends packets to the telemetry server to represent significant events, including death, location of death, weapon used, player killed, and time. The collection of event data is collated by the telemetry server and published as in a Match History page accessible to users on the internet. In the multiplayer shooting game embodiment, information related to the player's shooting can also be published including location of shots landed on enemies with the appropriate percentages of where the shots land on, e.g., head, torso, arms, legs, neck, hands, groin, or foot. The telemetry server can also break down the telemetry data into classes and transferred to the appropriate database for storage. For instance, in the current embodiment, kill data and shot location are separate classes and thus each event is logged in a separate database or folder for further analysis, manipulation, or publishing.

News files are also stored in the Title Name Space 102 and can be used to deliver targeted news content related to the player's gaming experience. The system could utilize user specific information from the User Space 105 to selectively determine the news content to deliver to the player console 400. For the implementation of the news system, the present invention utilizes an inbox type system that utilizes a key and language to recall the appropriate news story from the server 100. Based on the profile of the user, the console 400 generates a key URL and includes the language preference of the player to recall the appropriate news story from the server 100. This way, the developer can create a single news story with multiple language variants and place them into a folder located at a key URL with all the language variants inside the folder. This allows the news stories to be narrowly tailored and minimizes traffic on the network 100 and also allows publishers a quick way of organizing and publishing a single news file in multiple languages.

The background script files enable developers to fix bugs in the game without a software update. Background script files run using the game's existing script language and operate at a lower level than the script event files. Background script files are accompanied by a manifest file that identifies when to run the script during the game. This way bugs at certain points in a game can be fixed quickly by the background script running in the game. Moreover, the manifest allows the scripts to be run efficiently so they only take up game resources when and where they are needed. The manifest can trigger the background script files based on a triggering event, a time, or to initiate at the start of the game depending on the bug.

In addition to bugs in a game, developers may also want to alter certain aspects of the game in order to improve the user's experience. These features generally relate to adjusting values and constants in order to create a balanced and fair game for players. Like the bugs, these tweaks need not be done through the laborious process of a software update, but instead can be quickly, selectively, and dynamically done through a script file. These types of tweaks generally do not require a constantly running script, but instead usually involve the modification of constant values. In one embodiment, the game is a multiplayer shooting game offering players a wide variety of weapons. Balance among these weapons is an important aspect of multiplayer game play, however obtaining the right values for the weapons requires trial and error and is a continual process that occurs after the initial release of the game. Thus, game developers can upload new weapons tuning files onto the Title Name Space 102 in the appropriate folder for the game to efficiently implement these changes.

Playlist files, achievement files, and multiplayer script event files are used to alter the rules and objectives of the game thereby providing players with a new gaming experience. More specifically playlist files provide players with a list of game types that a player may select and play through. For instance, in a multiplayer shooting game embodiment, a playlist file may have a series of matches such as: death matches, capture the flag, or any other series of match types. The parameters of each of these matches can be separately set, such that the playlist could include multiple types of death matches. The use of playlist files advantageously enables players to experiences a series of varied game types without the cumbersome process of configuring the system after each game. An additional advantage of the playlist files is that they allow players who enjoy the same experience to be grouped together and play a series of games, e.g., a series of death matches, without having to search for new groups after each game ends.

Achievement files may provide players with new tasks to complete in order to obtain achievement awards. The tasks may be tiered and award players based on certain levels of achievement. Finally, multiplayer script event files, discussed in greater detailed in concurrently filed and commonly assigned application Ser. No. 13/894,109, entitled, "System and Method for Multiplayer Network Gaming," incorporated herein by reference, enables game play to be modified with a script event file without the need for a software update.

With the plurality of game altering files and the dynamic nature of these files, there is a potential for players to have mismatching files. Players with mismatching files should not be able to play together as it creates the potential for undesired consequences such as unfair advantage or even a crash of the game. To prevent this, the system provides a check before players can initiate multiplayer games. Upon the start of the player console 400, the console communicates with the cloud 100, and more specifically the Title Name Space 102 through the CDN 200, to obtain any new background script, playlist files, achievement files, constants files, or multiplayer script event files. Once the files have been received, the console executes an algorithm that generates a hash value based on the player's existing set of game files; thus players with the same set of files will have the same hash value. Hashing algorithms are well known in the art and a suitable hashing algorithm can be readily applied or developed. The multiplayer game system only enables players with matching hash values to play with each other. This can be performed with a hash value check done when the system searches for available multiplayer games. The list of games returned would only result in games where other players have the same hash value. The hash value can also be used to classify players as cheaters which is described in greater detail in concurrently filed and commonly assigned application Ser. No. 13/894,112, entitled, "System and Method for Online Community Management," incorporated herein by reference.

User Generated Content Space:

User generated content may be stored in a separate section. Alternatively, it may also be stored in the User Name Space, discussed below. User generated content relates to any content that the user can create and incorporate into the game such as artwork, badges, or emblems. More specifically, the User Generated Content Space is used to allow users to publish content that they have edited and stored in their User Space. Once this content is published, it becomes publically available to all other users so they can interact with the user generated content such as comment, evaluate, like, share, and save the published user generated content.

User Group Space:

To increase player engagement, players are allowed to join a group of players identified by the system as being linked. Players in groups may engage in team play that enables them to access additional game events not provided to lone players. The User Group Space 104 enables players to store their group emblem, post messages to other group members, interact with other group members, and view their group history/stats. The telemetry system may also store stats related to groups here. Players are given the option of joining multiple groups, but they can only be active in one group at a time. A player that belongs to more than one group must select one group they wish to be active at a time.

User Space:

The User Space 105 is where player specific information is stored: game data, saved games, user specific stats, game options, and player avatars. Storing such information on the network enables players to access and play their game from any console connected to the network. Developers may also provide tags that enhance or diminish a player's status such as a user specific experience modifier, admin tags, and cheater tags. Admin tags allow developers to tag themselves or designed players as administrative staff which may enable them access to admin menus. Finally, the cheater tag information may be stored here to classify abusive players. The cheater tag system is described in greater detail in concurrently filed and commonly assigned application Ser. No. 13/894,112, entitled, "System and Method for Online Community Management," incorporated herein by reference.

User Group Interaction Event System utilizes the system's network architecture to implement an enhanced gaming experience to players by dynamically initiating events within a game. During the play of a game, members playing in the same group may initiate an in game event with members from another group if certain criteria are met. These criteria may be modified using script event files as discussed above. A feud is used, for example, in instances during a game where one group has obtained a significant advantage over another group. Or, feuds can be initiated pursuant to criteria that demonstrate that particular groups regularly engage with one another. A detailed discussion of one embodiment of the User Group Interaction Event System will be described in a multiplayer shooting game, but it should be understood that the system can be applied to many other games and different criteria can be used.

Figure 3:
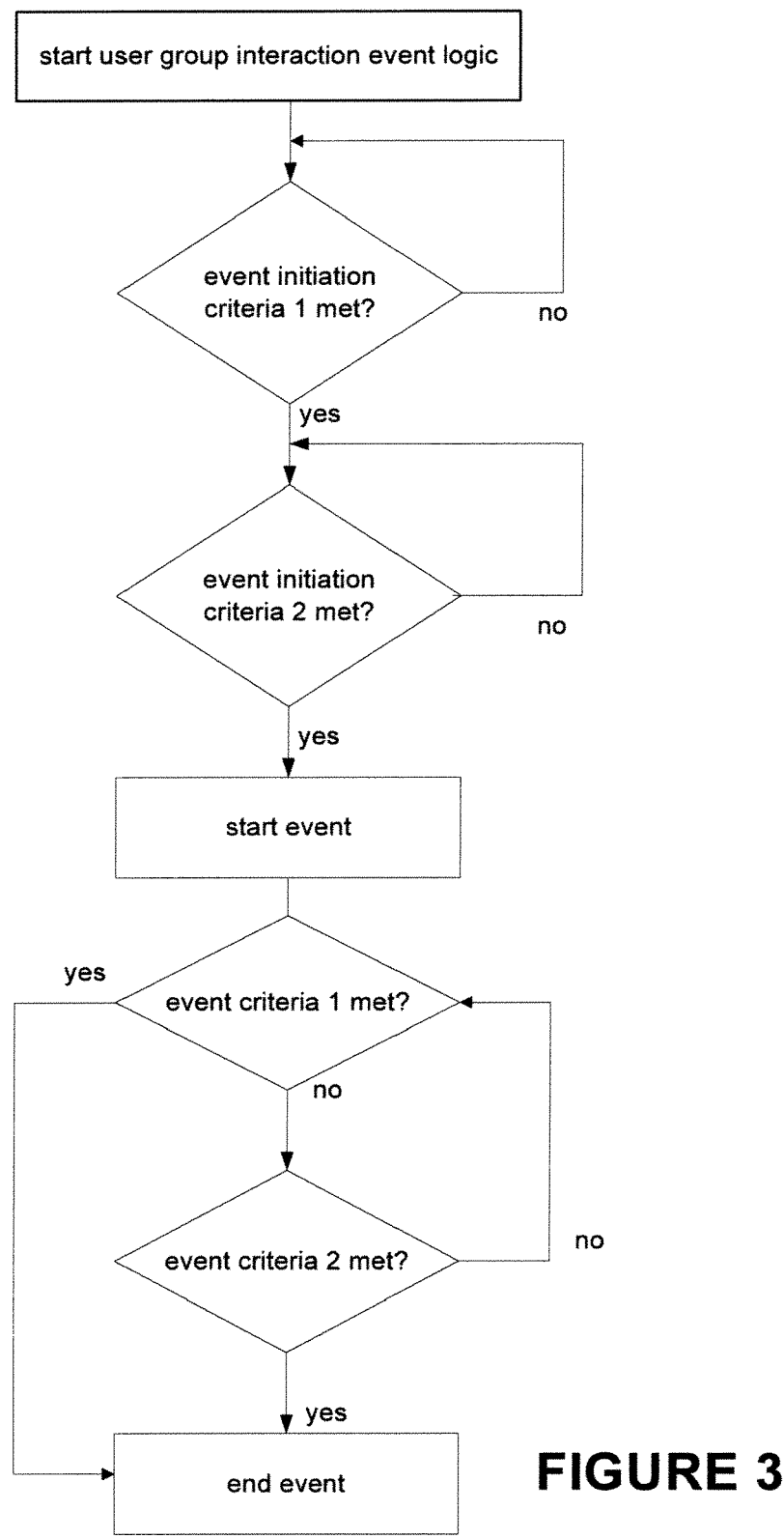
FIG. 3 is a flow chart depicting the logic used in the User Group Interaction Event System.

FIG. 3 depicts an embodiment of the User Group Interaction Event System implemented in a multiplayer shooting game. During play of the game, the telemetry system records all game events such as deaths and scores. The telemetry system further records event related criteria counters in a matrix for each group tracking scores/kills against all other groups in the User Group Space. Criteria counters are incremented in the telemetry system. There are several event initiation scripts that monitor whether certain criteria have been met before initiating a User Group Interaction Event. These scripts and event logic are performed at the player console. One criteria could require a minimum number of players in each group, for example two members per group. Another criteria determines when members of one group gain a significant score advantage over the members of a second group, for example 5 more group member kills.

In the current multiplayer shooting game embodiment, there must be at least two members from a first group and two members from a second group currently playing in the game. If the members from the first group kill members from the second group six times while members from the second group have only killed members from the first group once, then on the first group's sixth kill, the first and second criteria have been met and the game initiates a User Group Interaction Event. To signal an event, the game can implement special effects, graphics, sounds, and announcements to increase player excitement. Players are then notified of the criteria of the event that they must meet, e.g., kill members from the opposing group a minimum number of times. Once an event has been initiated, an event script will monitor whether the event criteria has been met. An event may have multiple criteria, usually this will involve a score counter criteria with a time limit. Returning to the current embodiment, once the event starts, an event timer is initiated as an event criteria 1. To win the event, players from a group must achieve a minimum number of kills of players from the opposing group to meet event criteria 2. The first group to satisfy event criteria 2 will be determined the winner and the event ends. Event winners may be awarded game points, badges, in game boosts, bonuses, or any other type of incentive. If neither group obtains the required kill count, the event ends without a winner. Multiple events may be initiated within a game at a time. Upon the completion of an event, the telemetry system stores the results and can also transmit them to the User Group Space for publishing.

In other embodiments, event initiation criteria and event criteria can include, number of flags captured, total points stored, head shots, or any other quantifiable game metric. In further embodiments, events need not be isolated to a single multiplayer game match, but can span several concurrently occurring multiplayer matches or even across different game titles.

The system and method also enable game content to be shared across platforms and titles. Players can incorporate content from different games or applications. Cross platform content can be sub or mini games that can be played on the same or another console or a mobile application on a smartphone that helps the player progress in the main console game.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A network gaming system for altering operation of a distributed game comprising:
   a console having a processor;
   a network interface connected to the processor that connects to the network, wherein the network comprises a global name space, a title name space, a user generated content space, a user group space, and a user space, each of the spaces hosting files for altering a unique aspect of the distributed game; and
   memory connected to and in communication with the processor containing processor executable instructions including game code;
   wherein the processor is configured to execute instructions contained in the memory and the instructions are structured to cause the console to:
      obtain a script file and a manifest via the network interface;
      generate a hash value based on the game code;
      selectively display a list of available games to join where all players have the same hash value; and
      execute the game code;
      execute script code obtained in the script file according to conditions specified by the manifest, said manifest binding the script code to the game code to create an altered game experience to the player, wherein the script file is a group event file comprising:
         a plurality of event initiation criteria; and
         a plurality of event criteria, wherein the event invitation criteria comprises:
            a first event initiation criteria determining whether there are enough players in a first and second group;
            a second event initiation criteria determining whether a first or second group has achieved a minimum score advantage; and
            if both event initiation criteria are met, initiating an event between the first and second group.

2. The system of claim 1 wherein the obtaining of script file further comprises a second script file that modifies constant values.

3. The system of claim 1 wherein the manifest specifies executing the script code in response to an event in the game code.

4. The system of claim 1 wherein the obtaining of script file further comprises a second script file that is a group event file.

5. The system of claim 1 wherein the network interface transmits game play data to a telemetry system.

6. The system of claim 5 wherein the telemetry system collects and selectively publishes game play data as a match history.

7. The system of claim 1 wherein the processor is further configured to generate a unique value based on the all script files contained in the memory.

8. The system of claim 1 wherein the event comprises:
   an event notification sent to all players in the first and second groups;
   initiating an event timer;
   determining whether an event criteria has been met; and
   ending the event once the event timer has ended or the event criteria is met by a group, whichever occurs first.

9. The system of claim 8 wherein the event further comprises awarding the group that meets the event criteria a score, bonus, or badge.

10. The system of claim 7 wherein the processor is further configured to use the unique value to search and return a list of available game matches having the same script files.

11. A computer implemented method for altering game comprising:
    receiving a plurality of script files in a console via a network comprising a global name space, a title name space, a user generated content space, a user group space, and a user space, each of the spaces hosting files for altering a unique aspect of at least one available game;
    the console executing an algorithm generating a hash value based on the console's existing script files;
    selectively displaying a list of the available games for the player to join where all players have the same hash value; and
    executing the script files to alter functionary of the game without altering the game's executable file by binding the script files to the game's executable via a manifest of the script files, wherein a selected script file is a group event file comprising:
       a plurality of event initiation criteria; and
       a plurality of event criteria, wherein the event invitation criteria comprises:
          a first event initiation criteria determining whether there are enough players in a first and second group;
          a second event initiation criteria determining whether a first or second group has achieved a minimum score advantage; and
          if both event initiation criteria are met, initiating an event between the first and second group.

12. The method of claim 11 wherein the plurality of script files comprises a background script file with manifest, values and constants file, and the group event file.

13. The method of claim 11 further comprising:
    joining a game with other consoles having the same hash value;
    transmitting game play data to a telemetry system.

14. The method of claim 11 wherein at least one of a plurality of script files is a group event file comprising at least one event initiation criteria and at least one event criteria.

15. The method of claim 14 further comprising:
    using the group event file to determine whether to initiate a game event based on the event initiation criteria;
    initiating the event involving a plurality of players;
    determining whether to end the event based on at least one event criteria;
    ending the event once the at least one event criteria is met;
    awarding players if they achieve an event criteria.

16. The method of claim 12 wherein the console uses the manifest to determine when to execute the background script file in order to fix a bug in the software.

17. The method of claim 11 wherein altering the functionary of the game comprises altering constant values in the game.

18. The method of claim 11, wherein altering the functionality of the game comprises altering objectives and rules of the game.

19. A non-transitory computer readable medium having instructions for causing a computer to execute a method comprising:

receiving a plurality of script files in a console via a network comprising a global name space, a title name space, a user generated content space, a user group space, and a user space, each of the spaces hosting files for altering a unique aspect of at least one available game;

the console executing an algorithm generating a hash value based on the console's existing script files;

selectively displaying a list of the available games for the player to join where all players have the same hash value; and executing the script files to alter functionary of the game without altering the game's executable file by binding the script files to the game's executable file via a manifest of the script files, wherein a selected script file is a group event file comprising:

a plurality of event initiation criteria; and a plurality of event criteria, wherein the event invitation criteria comprises:

a first event initiation criteria determining whether there are enough players in a first and second group;

a second event initiation criteria determining whether a first or second group has achieved a minimum score advantage; and if both event initiation criteria are met, initiating an event between the first and second group.

* * * * *